United States Patent
Eloy et al.

(10) Patent No.: US 10,249,107 B2
(45) Date of Patent: Apr. 2, 2019

(54) FAULT MANAGEMENT METHOD FOR A VEHICLE ENGINE CONTROL SYSTEM

(71) Applicants: CONTINENTAL AUTOMOTIVE FRANCE, Toulouse (FR); CONTINENTAL AUTOMOTIVE GmbH, Hannover (DE)

(72) Inventors: Stephane Eloy, Tournefeuille (FR); Lionel Cailler, Sainte Foy de Peyrolieres (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/198,113

(22) Filed: Jun. 30, 2016

(65) Prior Publication Data
US 2017/0011567 A1    Jan. 12, 2017

(30) Foreign Application Priority Data

Jul. 10, 2015    (FR) ..................................... 15 56563

(51) Int. Cl.
*G01M 17/00* (2006.01)
*G06F 7/00* (2006.01)
(Continued)

(52) U.S. Cl.
CPC ........... *G07C 5/0808* (2013.01); *F02D 41/22* (2013.01); *G07C 5/006* (2013.01); *G07C 5/0841* (2013.01); *Y02T 10/40* (2013.01)

(58) Field of Classification Search
None
See application file for complete search history.

(56) References Cited

U.S. PATENT DOCUMENTS

| | | | | |
|---|---|---|---|---|
| 4,748,843 A * | 6/1988 | Schafer | ................ | G07C 5/0808 701/32.8 |
| 7,359,774 B2 * | 4/2008 | Grenn | .................... | G07C 5/006 340/438 |

(Continued)

FOREIGN PATENT DOCUMENTS

| | | |
|---|---|---|
| DE | 100 53 828 A1 | 5/2002 |
| EP | 1 998 183 A1 | 12/2008 |

(Continued)

OTHER PUBLICATIONS

FR Search Report, dated Apr. 11, 2016, from corresponding FR application.

*Primary Examiner* — Anne M Antonucci
*Assistant Examiner* — Kenny A. Taveras
(74) *Attorney, Agent, or Firm* — Young & Thompson

(57) ABSTRACT

A method of managing faults for a vehicle engine control system, includes a plurality of monitoring or observation strategies monitoring a plurality of components and using diagnostics to detect the presence of faults in the plurality of components. For each monitoring or observation strategy, referred to as a diagnosis, if it diagnoses the presence of a fault in a component, the fault detected in the diagnosed component is stored and all the monitoring or observation strategies continue to detect the presence of faults in all of the components that they respectively monitor, but the presence of the fault in the diagnosed component is ignored so as to enable the detection of the presence of other faults, if any, in components other than the diagnosed component.

9 Claims, 2 Drawing Sheets

(51) Int. Cl.
    *G06F 19/00* (2018.01)
    *G07C 5/08* (2006.01)
    *F02D 41/22* (2006.01)
    *G07C 5/00* (2006.01)

(56) References Cited

U.S. PATENT DOCUMENTS

| | | | | |
|---|---|---|---|---|
| 9,355,506 B2* | 5/2016 | Raynal | ............. | G07C 5/0808 |
| 9,384,604 B1* | 7/2016 | Manoukis | ............. | H04W 4/046 |
| 9,514,580 B2* | 12/2016 | Collins | ............. | G07C 5/0808 |
| 2007/0198147 A1* | 8/2007 | Keith | ............. | G01R 31/007 |
| | | | | 701/31.4 |
| 2008/0162025 A1* | 7/2008 | Groer | ............. | G07C 5/085 |
| | | | | 701/115 |
| 2009/0306849 A1* | 12/2009 | Blanz | ............. | G05B 23/0264 |
| | | | | 701/31.4 |
| 2010/0305814 A1* | 12/2010 | Ichikawa | ............. | G07C 5/085 |
| | | | | 701/33.4 |
| 2011/0238258 A1* | 9/2011 | Singh | ............. | G07C 5/0808 |
| | | | | 701/31.4 |
| 2013/0338870 A1* | 12/2013 | Farmer | ............. | B60K 11/085 |
| | | | | 701/29.2 |
| 2015/0070042 A1* | 3/2015 | Granig | ............. | G01R 31/2851 |
| | | | | 324/762.01 |
| 2015/0178998 A1* | 6/2015 | Attard | ............. | G07C 5/008 |
| | | | | 701/23 |
| 2016/0335818 A1* | 11/2016 | Lee | ............. | G07C 5/0808 |
| 2017/0011567 A1* | 1/2017 | Eloy | ............. | F02D 41/22 |

FOREIGN PATENT DOCUMENTS

| | | |
|---|---|---|
| EP | 2 808 846 A1 | 12/2014 |
| FR | 2949865 A1 | 3/2011 |
| KR | 101362718 B1 | 2/2014 |
| KR | 2014 0085133 A | 7/2014 |
| WO | 2009/024718 A2 | 2/2009 |

* cited by examiner

FAULT MANAGEMENT METHOD FOR A VEHICLE ENGINE CONTROL SYSTEM

FIELD OF THE INVENTION

The invention concerns on-board diagnostic systems for motor vehicles, commonly referred to, in this technical field, as OBD systems, using the English-language abbreviation standing for On-Board Diagnostic. To be more precise, the present invention is aimed at an improved fault management method for a motor vehicle engine control OBD system.

BACKGROUND OF THE INVENTION

In fact, on-board diagnostic systems—OBD systems—have for their main function the capacity to diagnose the presence of a fault in a propulsion component of the vehicle. OBD systems therefore consist in a set of hardware and software means for producing hardware diagnoses concerning the engine of vehicles.

The subject matter of the present invention concerns improving the operation of such OBD systems with the aim of increasing the relevance of the diagnoses produced.

In known manner, OBD systems hinge on on-board computers including strategies for monitoring or observation of the components of the engine in order to effect the most relevant possible fault diagnoses.

In practice, if a vehicle engine malfunctions, the dedicated computer detects the presence of a fault and the vehicle must be taken to a specialist mechanic for the latter to carry out investigations. First of all, the specialist mechanic will connect a computer to a special connector provided on the vehicle, generally referred to as the OBD connector, and use software to execute a method including a plurality of monitoring or observation strategies each adapted to process a plurality of components in order to produce the right diagnosis, consisting in designating the component responsible for the malfunction.

In fact, if a malfunction occurs in a vehicle, the objective of the OBD system is to determine the relevant fault. It is in fact crucial to produce the right diagnosis, which is complicated, notably if multiple malfunctions are detected, in order for the right component or components to be treated.

A fault in a component or a sporadic external event can sometimes generate the spurious detection of a malfunction in one or more other components that are not faulty, however. This is why the OBD system employs a fault management method able to filter the detected faults in order to retain only the relevant fault or at least a limited list of plausible faults.

Accordingly, in practice, if the OBD system detects a malfunction in a component, the corresponding fault is first considered intermittent. Following the application of a filtering strategy by the fault management method of the OBD system, the fault, if confirmed, is declared present and stored in a memory of the OBD system. The memory of the OBD system can subsequently be erased, either automatically or by a mechanic, when the fault is repaired or to carry out tests, for example.

Moreover, it is to be noted that particular attention is given to any fault affecting components liable to lead to a risk of increased pollution.

In fact, as a general rule, on-board diagnostics have become progressively more and more sophisticated, notably to enable engines to comply with increasingly strict statutory pollutant emission thresholds.

Thus sophisticated statutory requirements nowadays apply to motor vehicles and concern as much pollutant emission thresholds as methods and means to be employed to detect any failure of the ability to control those emissions and to alert the user to them.

These increasingly strict statutory requirements render optimum functioning of the OBD systems crucial.

In this context, as already mentioned, OBD systems employ fault management methods. Those methods include means generally referred to generically as FIM (Failure Interdependency Manager) means.

The fault management methods therefore consist mainly in a reaction strategy in the face of the faults detected, and in particular filtering of said detected faults in order, in the end, to flag only the relevant fault or a list of plausible faults. In other words, the fault management method employs monitoring or observation strategies adapted to produce diagnoses, said monitoring or observation strategies each monitoring a plurality of components in order, where applicable, to detect the presence of a fault in an engine component.

In practice, when a fault is detected as present, the effect of the diagnosis produced primarily causes the monitoring or observation strategy applied by the fault management method of the OBD system to order "fallback" to a reduced operating zone so as to ensure the operation of the minimum critical systems at the same time as protecting the engine components.

In the reduced operating zone, corresponding to a degraded mode of operation, the monitoring or observation strategies adapted to detect the presence of a fault can no longer function normally, and some diagnoses may no longer appear correctly. The monitoring or observation strategies monitoring a component for which a fault has been detected as present are in effect deactivated.

It is therefore crucial that the diagnostic strategies employed by the fault management method function optimally and that the calibration of all the hardware and software means of the OBD system is optimized accordingly.

SUMMARY OF THE INVENTION

The problem addressed in the context of the present invention is therefore particularly concerned with filtering faults detected by OBD systems with the intention that the faults declared present are indeed judiciously declared.

To be more precise, the fault management method in accordance with the invention is intended to be employed when the detection of the presence of a fault in the context of the use of a prior art strategy has proven irrelevant or to call for caution, either in that the treatment of said fault detected as present by the prior art strategy has proved insufficient or because the mechanic considers that said fault detected as present by the prior art strategy is doubtful or that fixing it represents a high cost.

In a context of investigations of this kind aiming to discover the defective component when a fault has occurred in a vehicle engine, the objective of the fault management method in accordance with the invention is an improved capability to flag the fault having the greatest chance of being the effective relevant fault or to propose a relevant list of plausible faults, intended for the mechanic carrying out said investigations.

To be more precise, the present invention concerns a method of managing faults for a vehicle engine control system, said method including a plurality of monitoring or observation strategies, each monitoring or observation strategy monitoring a plurality of components and using diagnostics to detect the presence of faults in said plurality of components.

The method in accordance with the invention of managing faults for a vehicle engine control system is remarkable in that for each monitoring or observation strategy, referred to as a diagnosis, if said monitoring or observation strategy diagnoses the presence of a fault in a component, therefore referred to as a diagnosed component, said fault detected in the diagnosed component is stored and all the monitoring or observation strategies continue to detect the presence of faults in all of the components that they respectively monitor, except in that the detection of the presence of a fault in the diagnosed component is taken into consideration so that the presence of the fault in the diagnosed component is ignored so as to enable the detection of the presence of other faults, if any, in components other than the diagnosed component.

In accordance with a first embodiment, the fault management method in accordance with the invention for a vehicle engine control system includes the following steps:
  i. the activation of an investigation operating mode to perform an advanced diagnosis of the engine control system,
  ii. in the event of detection of the presence of a fault in a component, therefore referred to as the diagnosed component, by a monitoring or observation strategy, referred to as a diagnosis, the deactivation of all the monitoring or observation strategies only in so far as they monitor the diagnosed component.

In accordance with a second embodiment, the fault management method in accordance with the invention for a vehicle engine control system includes the following steps:
  i. the activation of an investigation operating mode to perform an advanced diagnosis of the engine control system,
  ii. in the event of detection of the presence of a fault in a component, therefore referred to as the diagnosed component, by a monitoring or observation strategy, referred to as a diagnosis, all of the monitoring or observation strategies continue to monitor all of the components, including the diagnosed component, the presence of the fault already detected in the diagnosed component being ignored.

The fault management method in accordance with the invention for a vehicle engine control system advantageously includes the reiteration of the second step until the presence of a fault is no longer detected.

In accordance with the first embodiment, the fault management method in accordance with the invention for a vehicle engine control system includes the proposition of a fault considered the most probable, corresponding to the last fault detected as present.

In accordance with the second embodiment, the fault management method in accordance with the invention for a vehicle engine control system includes the proposition of a list of faults considered plausible, corresponding to the list of faults detected as present.

Still in accordance with the second embodiment, the list of faults considered plausible includes information relating to the chronological order in which said faults considered plausible were detected as present. In fact, the last fault in this list detected as present is the most probable.

The present invention also concerns a motor vehicle including an engine control system including electronic and software means for implementing the fault management method as succinctly described above.

BRIEF DESCRIPTION OF THE DRAWINGS

The invention will be better understood on reading the following description given by way of example only and with reference to the appended drawings, in which.

DETAILED DESCRIPTION OF THE INVENTION

It should be noted that the figures explain the invention and may of course also serve to define the invention more clearly.

The invention is mainly described in an application to a motor vehicle. However, the present invention is also aimed at other applications, notably with a view to its use in any type of terrestrial vehicle.

Two main embodiments of the fault management method in accordance with the invention for a vehicle engine control system are described hereinafter and illustrated by the flowcharts shown in FIGS. 1 and 2.

The fault management method in accordance with the invention aims to improve the relevance of the fault diagnoses made possible by an OBD system. To this end, the fault management method in accordance with the invention is implemented in particular in a special mode of operation of the OBD system making possible investigations carried out by a mechanic when a fault has been detected in the engine of a vehicle.

Figure 1:
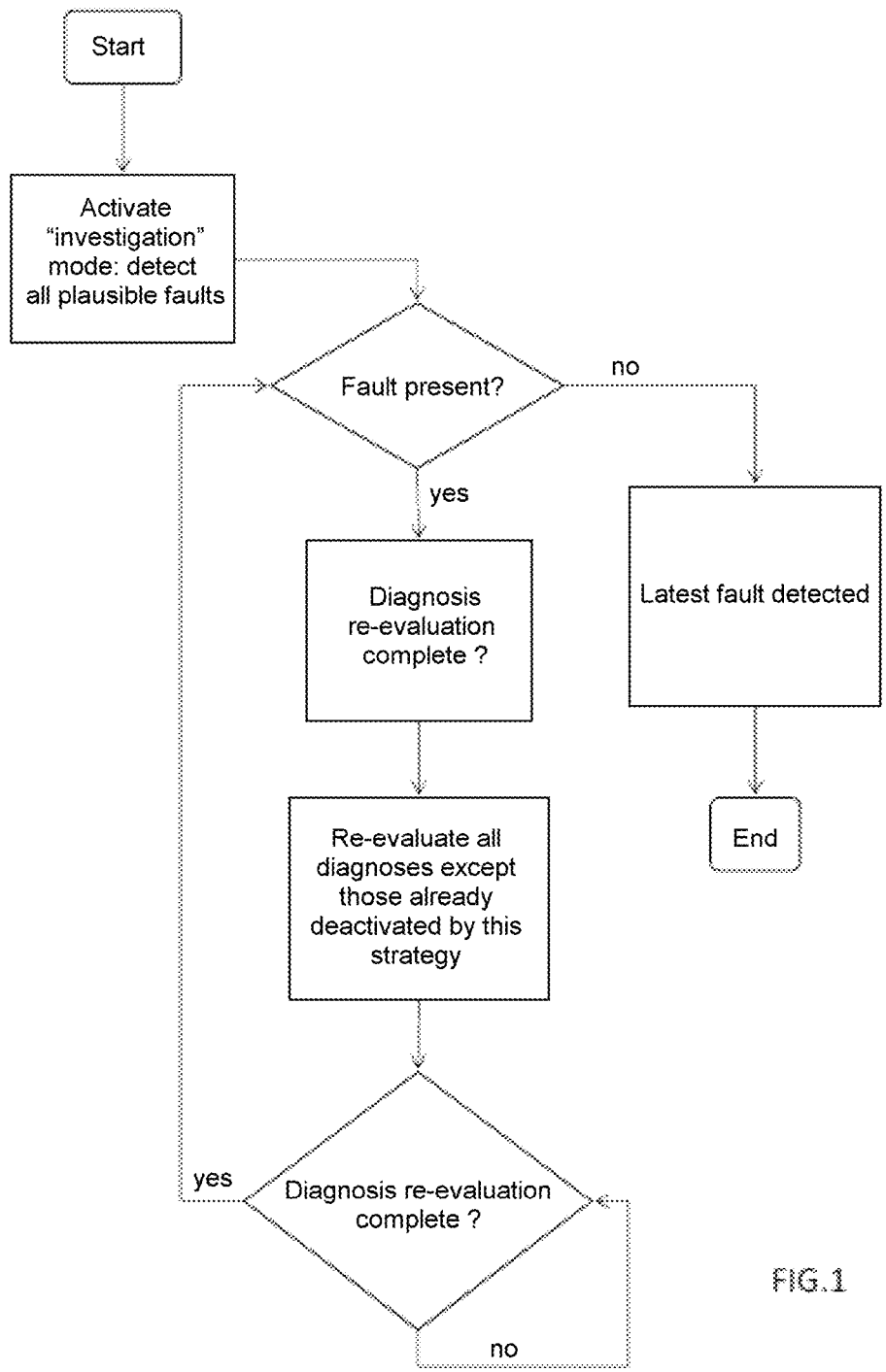
FIG. 1 represents a flowchart showing how the fault management method in accordance with a first embodiment of the invention functions, by deactivation of the diagnostic strategies.
Figure 2:
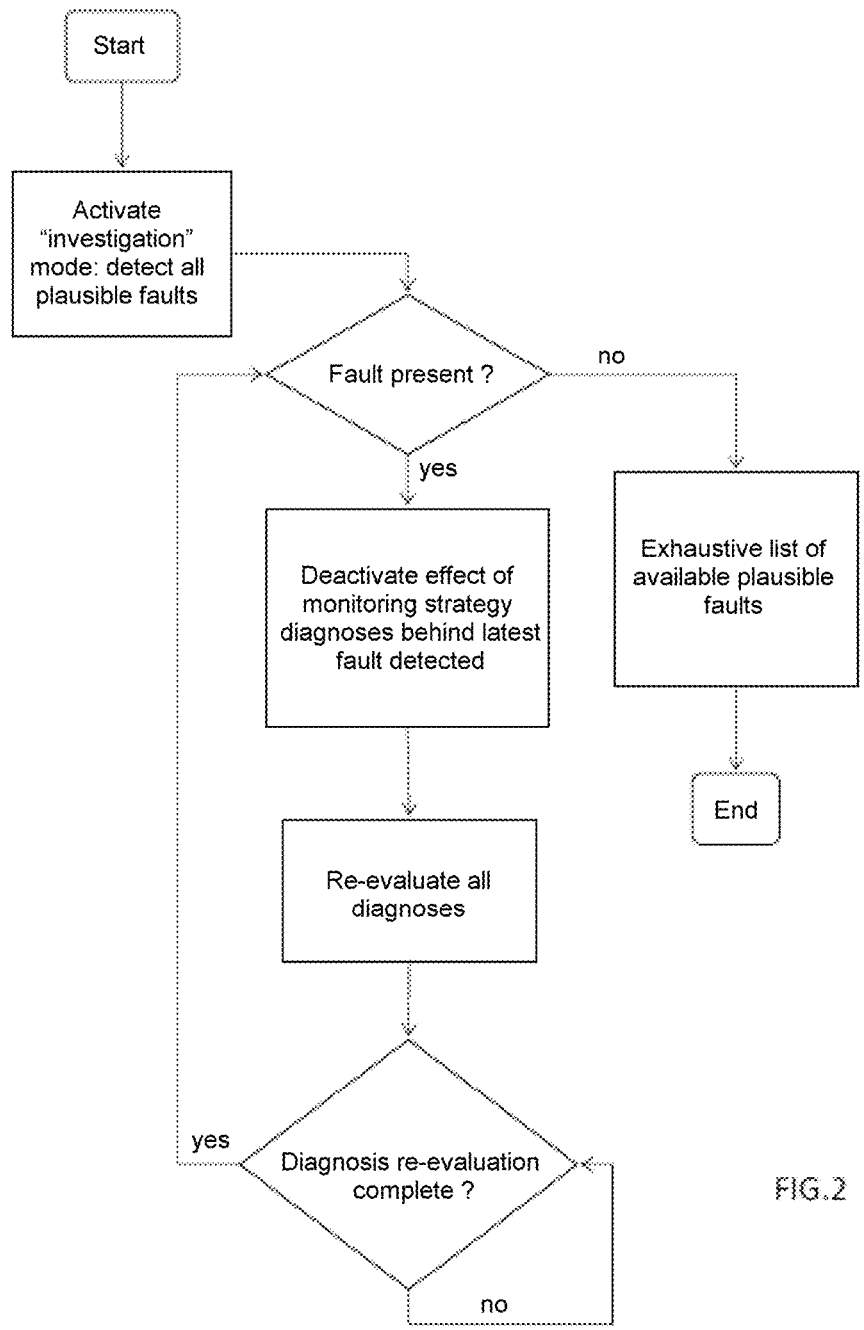
FIG. 2 represents a flowchart showing how the fault management method in accordance with a first embodiment of the invention functions, by deactivation of the effects of the diagnostic strategies.

As shown in FIGS. 1 and 2, the fault management method in accordance with the invention therefore preferably begins with a step of activating an "investigation" mode of operation corresponding to a particular mode of operation in which a mechanic executes the fault management method in accordance with the invention with the aim of determining the cause of a malfunction detected in the engine of a vehicle.

As a fault management method, implemented by an OBD system, the method in accordance with the invention employs a plurality of monitoring or observation strategies each monitoring a plurality of components of the engine of a vehicle.

Those strategies are able to detect the presence of a fault in a component.

In accordance with the present invention, when a fault is considered to be present in a component, according to the diagnosis carried out using a monitoring or observation strategy, all the monitoring or observation strategies are re-evaluated, the fault already considered to be present then being ignored, so as to enable the detection of a possible more relevant, i.e. more plausible, other fault. If a new fault is in fact detected, the re-evaluation of the monitoring or observation strategy is repeated. There are then two main embodiments.

Referring to FIG. 1, for as long as a new fault is detected as present in a component by a monitoring or observation strategy, the fault management method in accordance with the invention repeats the following steps for each monitoring or observation strategy:

i) the deactivation of the diagnosis or diagnoses of the latest fault or faults detected: this amounts to ignoring, as well, the monitoring of the latest component or components considered faulty by all of the strategies that the monitoring of said component normally concerns. It is therefore the very possibility of diagnosis that is deactivated; the component is no longer diagnosed faulty, but the fault detected as present has been stored;

ii) the re-evaluation of all the diagnoses, with the exception of those already deactivated for this strategy: this amounts to re-evaluating all the diagnoses concerning all the components monitored by each strategy, with the exception of the diagnoses aimed at the component that a fault previously considered as present concerns.

When all the diagnoses have been re-evaluated, if a new fault has been detected as present, the two steps explained above are executed again.

When no fault is any longer detected as present, the latest fault to be detected as present is proposed to the mechanic as being the most probable.

The latest fault detected as present at the end of the execution of the method is in fact the most probable, because it is arrived at the end of a string of potential faults detected as present, and the first fault detected as present, in the context of the use of a prior art strategy, has proven irrelevant or as calling for caution, as explained above.

Referring to FIG. 2, as long as a fault is considered as present in a component by a monitoring or observation strategy, the fault management method in accordance with the invention repeats the following steps for each monitoring or observation strategy:

i) the deactivation of the effect of the diagnoses of the monitoring or observation strategy behind the latest fault detected: this amounts to continuing the monitoring of the component already considered as faulty, but ignoring the consequences of the detection of the presence of said fault. The fault concerned is therefore detected again but ignored, with the result that the monitoring or observation strategy does not confine its action to a reduced operating zone and continues to function as normal in order to be able to diagnose any other faults in other components that it is monitoring. Thus only the effects of the diagnoses are deactivated. When a monitoring or observation strategy has detected the presence of a fault in a component, during its re-evaluation in the context of execution of the method in accordance with the invention, the components already diagnosed as being faulty are therefore re-evaluated but the corresponding diagnoses no longer produce any effect. This enables the subsequent detection of "new" faults in other components by said monitoring or observation strategies. Each fault detected as present is stored;

ii) the re-evaluation of all the diagnoses: this amounts to re-evaluating all the diagnoses concerning all the components monitored by each monitoring or observation strategy, the diagnoses relating to faults having previously been considered as present having no effect on the other monitoring or observation strategies, however.

As in the previous embodiment, when all the diagnoses have been re-evaluated, if a new fault has been detected as present the two steps explained above are repeated.

When no fault is any longer detected as present, the list of the faults that have been detected as present, being considered as plausible, is proposed to the mechanic, with the chronological order in which said faults considered as plausible were detected. The first faults detected correspond to the faults that the system finds directly and spontaneously, the faults detected thereafter deriving from these first faults. In the end, it is always the expertise of the mechanic that makes it possible to determine the fault to be given priority, the monitoring or observation strategy making it possible to establish an automatic diagnosis constituting a decision-making aid.

Moreover, the chronological order in which the various faults from the list of plausible faults referred to above were detected as present is preferably also supplied to the mechanic.

To summarize, the present invention concerns the optimization of fault management for an OBD system responsible for fault diagnosis in vehicle, notably motor vehicle, engine control.

Thanks to the fault management method in accordance with the invention, the filtering of faults is improved, making it possible to establish the most probable fault or a list of plausible faults, in a more relevant manner than in the prior art.

The invention also concerns a vehicle including an engine control system including the electronic and software means for implementing the fault management method described above.

It is further specified that the present invention is not limited to the examples described above and lends itself to numerous variants that will be evident to the person skilled in the art.

The invention claimed is:

1. A method of detection of faults on a plurality of vehicle components, such method implemented by a motor vehicle engine control on-board diagnostic system, said method including a plurality of monitoring or observation strategies, each monitoring or observation strategy monitoring said plurality of components and using diagnostics to detect the presence of faults in said plurality of components, wherein, for each monitoring or observation strategy, referred to as a diagnosis, if said monitoring or observation strategy diagnoses the presence of a fault in a component, therefore referred to as a diagnosed component, said fault detected in the diagnosed component is stored and all the monitoring or observation strategies continue to detect the presence of faults in all of the components that they respectively monitor, except in that the detection of the presence of a fault in the diagnosed component is taken into consideration so that the presence of the fault in the diagnosed component is ignored so as to enable the detection of the presence of other faults, if any, in components other than the diagnosed component.

2. The method of detection of faults on a plurality of vehicle components implemented by a motor vehicle engine control on-board diagnostic system as claimed in claim 1, which includes the following steps:

i. the activation of an investigation operating mode to perform an advanced diagnosis of the engine control system, ii. in the event of detection of the presence of a fault in a component, therefore referred to as the diagnosed component, by a monitoring or observation strategy, referred to as a diagnosis, the deactivation of all the monitoring or observation strategies only in so far as they monitor the diagnosed component.

3. The method of detection of faults on a plurality of vehicle components implemented by a motor vehicle engine control on-board diagnostic system as claimed in claim 2, which includes the reiteration of the second step until the presence of a fault is no longer detected.

4. The method of detection of faults on a plurality of vehicle components implemented by a motor vehicle engine control on-board diagnostic system as claimed in claim 3, which includes the proposition of a fault considered the most probable, corresponding to the last fault detected as present.

5. The method of detection of faults on a plurality of vehicle components implemented by a motor vehicle engine control on-board diagnostic system as claimed in claim 1, which includes the following steps:
   i. the activation of an investigation operating mode to perform an advanced diagnosis of the engine control system,
   ii. in the event of detection of the presence of a fault in a component, therefore referred to as the diagnosed component, by a monitoring or observation strategy, referred to as a diagnosis, all of the monitoring or observation strategies continue to monitor all of the components, including the diagnosed component, the presence of the fault already detected in the diagnosed component being ignored.

6. The method of detection of faults on a plurality of vehicle components implemented by a motor vehicle engine control on-board diagnostic system as claimed in claim 5, which includes the reiteration of the second step until the presence of a fault is no longer detected.

7. The method of detection of faults on a plurality of vehicle components implemented by a motor vehicle engine control on-board diagnostic system as claimed in claim 6, which includes the proposition of a list of faults considered plausible, corresponding to the list of faults detected as present.

8. The method of detection of faults on a plurality of vehicle components implemented by a motor vehicle engine control on-board diagnostic system as claimed in claim 7, wherein the list of faults considered plausible includes information relating to the chronological order in which said faults considered plausible were detected as present.

9. A motor vehicle engine control on-board diagnostic system configured for implementing a method of detection of faults on a plurality of vehicle components, said method including a plurality of monitoring or observation strategies, each monitoring or observation strategy monitoring said plurality of components and using diagnostics to detect the presence of faults in said plurality of components, wherein, for each monitoring or observation strategy, referred to as a diagnosis, if said monitoring or observation strategy diagnoses the presence of a fault in a component, therefore referred to as a diagnosed component, said fault detected in the diagnosed component is stored and all the monitoring or observation strategies continue to detect the presence of faults in all of the components that they respectively monitor, except in that the detection of the presence of a fault in the diagnosed component is taken into consideration so that the presence of the fault in the diagnosed component is ignored so as to enable the detection of the presence of other faults, if any, in components other than the diagnosed component.

* * * * *